Dec. 9, 1958 V. E. LISHER 2,863,776
FROZEN BEVERAGE AND METHOD FOR MAKING THE SAME
Filed Aug. 4, 1954
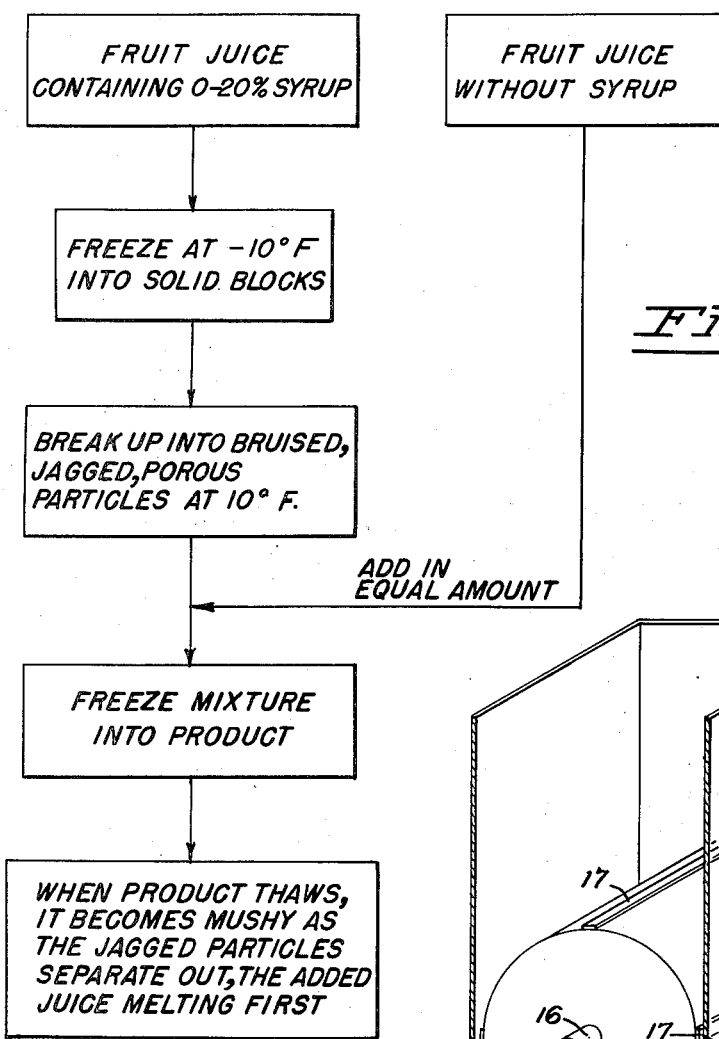
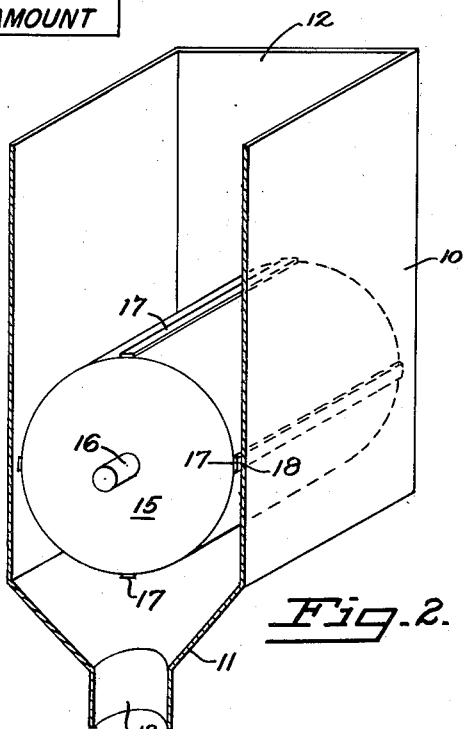
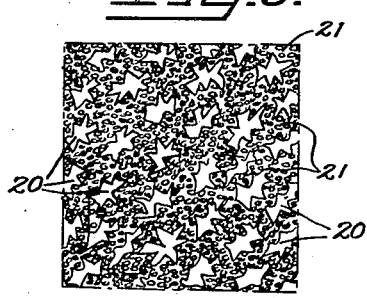
INVENTOR.
VELMA E. LISHER
ATTORNEY

United States Patent Office 2,863,776
Patented Dec. 9, 1958

2,863,776

FROZEN BEVERAGE AND METHOD FOR MAKING THE SAME

Velma E. Lisher, Berkeley, Calif.

Application August 4, 1954, Serial No. 447,720

10 Claims. (Cl. 99—136)

This invention relates to a novel frozen product, to a novel cold beverage, and to a novel method for making the frozen product and the beverage. This application is a continuation-in-part of my application, Serial No. 243,919, filed August 27, 1951.

The invention is well adapted for the preparation of novel beverages and the like from fruit juices, such as orange juice, grape juice, pineapple juice, grapefruit juice, papaya juice, tomato juice, loganberry juice, boysenberry juice, raspberry juice, lemonade, and the like, and from vegetable juices, such as carrot juice, and cabbage juice. It is also suitable for use with other types of drinks, such as root beer, milkshakes, and other soft drinks. It makes possible service of such drinks in individual cartons directly from a freezer or counter, or service by hawkers carrying no refrigerant with them, replenishing their wares from time to time and permitting the frozen beverages to thaw as they sell them.

The frozen product of this invention is thawed to provide the cold beverage. It is different from all other frozen beverages, in that, when served in its partially thawed state, it comprises a large quantity of discrete frozen particles floating in liquid, both the frozen particles and the liquid having substantially identical constitution. For example, in an orange beverage made according to this invention a slush of frozen orange juice particles will float in liquid orange juice.

The present invention is to be distinguished from the products of the prior art such as frozen whole juices, frozen dilute juices, and frozen juice concentrates. All these products, when they thaw, melt first on their outer surfaces and melt inwardly, so that the block of frozen material gets progressively smaller but remains to the end a single solid, relatively hard, central block melting only at its outer surface. The prior-art frozen products are difficult and inconvenient to drink because of this slow-thawing central core, which always interferes with anyone trying to drink. In contrast, the product of the present invention, which is also a solid block before it begins to thaw, almost immediately breaks down into a slush that is easy and satisfying to drink. Due to its novel constitution, the frozen product of this invention on thawing automatically converts itself—without the use of any equipment—into a drink resembling snow-ice floating in liquid, both the ice and the liquid being of the same general constitution.

Where beverages are sold in quantities for public consumption—as at football games and other sports events, at State fairs and beaches—problems have arisen, and the present invention solves many of these problems. Fruit juices, for example, must be sold cold. If kept in liquid form, most juices tend to separate out unless specially homogenized. If made fresh, they cannot be cooled quickly or uniformly. If ice is added, not only must ice-cracking or shaving equipment be available, but more important, the juice is diluted as the ice melts and the juice gets thinner the longer it stands. Frozen drinks have the disadvantages already pointed out of forming a solid central block as they thaw, and are very inconvenient to handle. Frozen concentrates require dilution and mixing and therefore take considerable labor to prepare in quantity.

The present invention retains the principal advantages of other frozen juices—convenience in handling and refrigeration, no labor except to hand them out, ease in storing and transporting, the ability to remain cold for a substantial period of time—without the aforenamed disadvantages. Because it thaws directly into a slush made up of a large number of discrete particles, it quickly reconstitutes itself for drinking. It is more cooling than a thawed drink. Yet, because the slush is not water-ice but is frozen juice, the drink does not become more dilute as the ice melts.

Generally speaking, the product of this invention comprises a frozen or partly thawed beverage made up of an aggregate or separate or discontinuous crystalline particles held together by a continuous mass of smaller crystalline particles which, apparently due to their being smaller crystals melt more readily than do the larger particles, so that when the drink is exposed to room or outside temperatures, it quickly thaws into a slush, which gradually turns into a liquid.

In other words, this invention is characterized by the fact that the frozen beverage comprises what may be termed an "aggregate" of discrete crystals or particles held together by what may be termed a "cement" of smaller crystals of the same juice. When the beverage thaws, the "cement" of smaller crystals melts first, leaving most of the bulk of the "aggregate" of somewhat larger crystals as free particles, thereby forming a slush.

The drink is cold and pleasing to the taste and retains the same strength at all times, from the time it first begins to thaw until the final particle is thawed. This is in marked contrast to drinks served with crushed ice or ice cubes, which dilute the drink.

Again speaking in general terms, the process for making the beverage comprises: first, freezing a quantity of the desired liquid into a homogeneous mass or block at a relatively low temperature; second, breaking up this block or mass into a large number of rather jagged, bruised, crystalline or multi-crystalline particles of a desired type and size; third, while keeping an aggregation of these particles at a temperature below freezing, pouring in cold liquid of substantially the same composition as the frozen particles so that all the voids are filled with the liquid; fourth, freezing the resultant mixture, so that the "aggregate" is "cemented" together by a continuous honeycomb or network of the smaller crystalline particles; and fifth, when the beverage is to be consumed, exposing it to a temperature above freezing so that as it thaws, the smaller crystalline network or "cement" will melt first, leaving the larger separated particles or "aggregate" as a slush in liquid which melts more gradually. Normally the beverage is drunk while the larger particles are in still slush state, giving a novel type of beverage.

As will be seen, the invention has not only the advantage of producing a novel and superior type of beverage, particularly for use at such places as football stadiums, fairs, beaches, and other recreational areas where refrigeration facilities are scarce and the use of crushed ice in fruit juices is desirable, but also has the advantage that once the juice is frozen properly it may be retained in that state for considerable periods of time and shipped in refrigerated cars to any desired location without changing its novel properties of melting into a slush instead of into a solid iceberg-like block.

Other objects and advantages of the invention will appear from the following description of preferred embodiments thereof.

In the drawings:

Fig. 1 is a flow chart of a preferred process for making the beverage of this invention, employing a fruit juice as the basic ingredient.

Fig. 2 is a view in elevation and partly in section of a machine suitable for use in breaking down the block into the aggregate of particles, when practicing the method of this invention.

Fig. 3 is a schematic enlargement of the crystalline structure of the frozen product as it is believed to appear.

The method of this invention begins with the choice of the basic ingredient—the liquid. For illustrative purposes, let us assume that orange juice has been selected. (It has already been noted that other beverages can be used, such as other juices, ades, milkshakes and soft drinks.) When using orange juice, the fresh juice is preferably frozen immediately after the juice has been squeezed, and, preferably, strained. Just before freezing, a simple or sugar syrup may be added to the juice in an amount up to and not exceeding 20% by weight. The syrup, when added, gives additional body to the juice, acts as a preservative, and tends to enhance the general process and product of this invention. Generally speaking, heavy bodied liquids (i. e., orange juice with the added syrup up to 20%) give more satisfactory results than with light bodied juices.

The juice, with or without syrup, is frozen quickly into solid blocks at a temperature of $-10°$ F. and it may be kept indefinitely at this temperature.

The next step in the process, as shown in the flow chart of Fig. 1 is to break up the solid blocks into bruised, jagged, porous particles. Normally this is done mechanically in a machine like that shown in Fig. 2. By keeping the machine at a low working temperature (preferably about $-10°$ F.) the frozen particles are kept from melting, the crystalline structure is better preserved, and there are some other desirable effects.

The machine of Fig. 2 has a large upper hopper 10 joined at its lower end to an integral lower hopper 11. The frozen blocks of juice are introduced at the upper end 12 of the upper hopper 10, and the discrete particles issue from the mouth 13 of the lower hopper 11. In the upper hopper 10 is mounted a drum or cylinder 15 which rotates upon an axle 16, and is provided with a plurality of blades 17. It has been found that an ideal dimension for these blades is about ⅛" high by about ½" wide, the blades extending the entire length of the drum 15 which may be about 12" for a drum 10" in diameter. The clearance 18 between the outer surface of the blades 17 and the wall 10 is preferably about ⅛". The drum 15 is rotated at a relatively high speed, say between 1,000 and 2,000 R. P. M. The chunks of frozen juice that are introduced in the upper end 12 of the hopper 10 fall down on the drum 15 and the rotating blades 17 shave off a few small particles and bounce the remaining large chunks up into the air and against the wall 10 bruising them. This combination of bruising and shaving seems to help in obtaining the right kind of crystalline or multi-crystalline particles for the "aggregate." As the chunks go up and down and bounce around, more particles are shaved off each time, and these bruised, jagged somewhat porous particles, pass through the clearance space 18 between the wall 10 and the blades 17 down through the lower hopper 11 and the mouth 13 into a suitable container (not shown). This method of reducing the hard blocks to small discrete particles seems to be highly superior and better than the ordinary methods of crushing or shaving ice.

The frozen or icy particles (which will form the "aggregate") are very small and irregular though they vary in size, and the mass somewhat resembles some forms of snow. The particles are very dry because of the low temperature; consequently they do not adhere to each other. They appear to be larger than ordinary single crystals and are jagged and, to some extent, porous, probably due to the cracking and shaving action to which they are subjected in the machine. These particles may be retained in this state so long as they are kept at temperatures of about $-10°$ F. or lower, or they may be used immediately in the next step.

As shown in the flow chart of Fig. 1, this mass of individual icy "aggregate" or particles is combined with a quantity of unfrozen juice, preferably well chilled. The proportions may be varied to suit desired results, but I generally prefer a half-and-half mix. This half-and-half mixture results in a very satisfactory beverage both as to its refrigeration properties and as to the general consistency of the finished product. It will be noted that the mass of icy particles are not compressed together in a single block as in the patent to Tressler, No. 1,896,529 because the product that results from comminution and compression acts just like a frozen block, in that it melts into a large block, soft only at its outer surfaces. If no juice were added, the customer would get only an aggregate of snow which would melt more slowly and the volume of the melted juices would be much less than the volume of the snow.

The unfrozen but chilled juice completely fills the voids, those spaces or interstices between the icy particles, and in the porous parts of these particles. Because the temperature is maintained at a low level (e. g., $-10°$ F.) while adding the juice and because of the initial low temperature of both the icy aggregate and of the unfrozen juice, the added juice does not melt the ice particles to any appreciable amount, and the appearance at this time is that of a slush. When all the air spaces have been filled by the added juice, the slush, packaged into suitable containers, is immediately frozen solid. The mass of frozen particles is then bonded together by the freezing of the added juice, much as concrete is formed by bonding a gravel aggregate together by cement. The jagged particles are large relative to the crystals into which the added juice freezes, so that they would correspond in a sense to the gravel of concrete, and the frozen juice with its smaller crystals in a sense corresponds to cement.

When frozen solid, the product may be stored for a considerable period of time, or it may be transported to a distant point of use without danger of spoilage. The structure of this product is shown diagrammatically in Fig. 3 where the larger particles 20 are surrounded by the mass of smaller crystals 21. It will be understood that Fig. 3 is diagrammatic in nature and is not intended to show the actual shape of the crystals, but it does show the general relationships.

When the product is to be merchandised at such places as football games, the beverage is normally served in waxed cardboard containers containing a suitable amount for one person to drink. It may be carried by the hawkers without their having to carry additional refrigeration. As they go among the people seated in the stadium, the product gradually melts, but this melting serves to prepare the beverage for actual drinking. This corresponds to the normal treatment elsewhere where the beverage is exposed to a temperature above freezing until the product thaws to the consistency of slush. As it thaws, the small "cementing" crystals apparently thaw first, due perhaps to their smaller size; the resultant product is, in effect, a reconstruction of the mushy or slushy condition corresponding to the state when the juice was added to the solid frozen aggregate particles. The principle involved is therefore entirely different than that involved where a solid block of frozen material melts, and it is also completely different from the melting of ice cubes, or crushed ice in a cold drink, where the drink is diluted as the ice melts.

An experiment was made comparing the thawing action of the product of this invention with the thawing action of other frozen products. First some juice was frozen into a block and then after freezing the block was permitted to thaw. The block was observed to thaw from the outside, the liquid running off and leaving a lump of ice continually reducing in size but always a hard solid lump. The experiment was repeated with sugar being added to the juice before it was frozen, but the results were the same.

Next, a frozen block of juice was comminuted and then packed under pressure as proposed by Tressler, Patent No. 1,896,529. This reconstructed block thawed in exactly the same way as the block mentioned in the preceding paragraph: that is, it melted around the outside leaving a packed center lump until that mass completely melted. When a fork was stuck into the central mass to break it up into smaller pieces, the smaller lumps melted in the same manner as the large block. This experiment also was repeated with sugar added to the juice before the juice was frozen, but the results were the same.

Next, the same procedure described in the preceding paragraph was repeated, but in this instance the reconstituted solid block was dipped in juice, to coat it as suggested by Tressler. However, the block behaved exactly the same as before, so far as its melting was concerned. The outer coating melted first, then the inside mass melted and continued to melt just as described in the foregoing paragraph. When this experiment was repeated with sugar added to the juice before freezing, the general results were the same, but the melting was a little quicker.

Finally, the product made according to the method of the present invention was prepared. Observation showed that as it began to thaw it loosened throughout and fell apart into particles forming a slushy liquid. When the liquid was not drained off, the melting continued until the whole finally became a liquid, and up until that moment there was at all times a slush of discrete icy particles. When the liquid was drained off, a mass of tiny particles remained which continued to melt individually. The fact that the particles are somewhat jagged, thereby providing air space in this instance, appears to hasten the melting and prevent them from forming a compacted block.

If the slush is refrozen relatively soon after becoming a slush, while the particles are still jagged, then on rethawing it will again form a slush, but if it is permitted to melt until the particles get rounded, it tends to form a block and less of a slush.

The product is pleasing to drink in the slushy form, especially on hot days, and it remains cold for a considerable amount of time, so that it is easy to merchandise and pleasant to consume over a long period of time while the slush is breaking down into a liquid.

To those skilled in the art to which this invention relates, many changes and widely differing embodiments and applications of the invention will suggest themselves without departing from the spirit and scope of the invention. The disclosures and the description herein are purely illustrative and are not intended to be in any sense limiting.

I claim:

1. A beverage-product preparing process comprising the steps of mixing a quantity of fresh fruit juice with simple syrup in quantity not in excess of 20% of the juices, hard-freezing the mixture to a block form, mechanically reducing the frozen mixture to a mass of icy particles while maintaining the mass under low-temperature conditions, mixing the mass with a substantially equal quantity of chilled but unfrozen juice, and refreezing the resultant mixture to a solid state.

2. A process as in claim 1, including the step of partially thawing the refrozen mixture preparatory to serving the product as a beverage, so that most of the later-added juice becomes a liquid, leaving icy particles in a greatly subdivided state instead of the entire mass thawing merely from the outside in, as in a solid block of once-frozen liquid.

3. A beverage-product preparing process comprising the steps of hard-freezing a quantity of fresh fruit juice; forming the hard-frozen quantity into a mass of sharp-edged icy particles while maintaining the mass under low-temperature conditions, mixing the mass with a substantially equal quantity of chilled but unfrozen juice, and refreezing the resultant mixture to a solid state.

4. A process as in claim 3, including the step of partially thawing the refrozen mixture preparatory to serving the product as a beverage, to the extent that most of the later-added juice thaws, leaving the earlier-frozen particles in a solid but subdivided state.

5. A method for making a cold beverage comprising the steps of: freezing a quantity of the desired liquid into a solid mass; comminuting said mass at a temperature well below freezing into a large number of rather jagged, bruised, particles; adding to a quantity of said particles an approximately equal quantity of the same liquid in a cold but still liquid form so as to fill all the voids in and between said particles; and freezing said mixture into a solidly frozen product.

6. The product prepared by the method of claim 5.

7. A method for making a cold beverage comprising the steps of: freezing a quantity of the desired liquid into a solid mass; comminuting said mass at a temperature well below freezing into a large number of rather jagged, bruised, particles; adding to a quantity of said particles an approximately equal quantity of the same liquid in a cold but still liquid form so as to fill all the voids in and between said particles; freezing said mixture into a solidly frozen product; and later thawing said product, thereby automatically producing a slush of said particles in melted liquid.

8. The product prepared by the method of claim 7.

9. A method for making a cold beverage comprising the steps of: freezing a quantity of fruit juice into a solid block; breaking up said block at a temperature well below freezing into a large number of rather jagged, bruised, particles; adding to a quantity of said particles an approximately equal quantity of the same liquid in a cold but still liquid form so as to fill all the voids in and between said particles; and freezing said mixture into a solidly frozen product.

10. A method for making a cold beverage comprising the steps of mixing fruit juice with up to 20% of a simple syrup; freezing at about −10° F. a quantity of said mixture into a solid block; breaking up said block at a temperature of about −10° F. into a large number of rather jagged, bruised, particles; adding to a quantity of said particles an approximately equal quantity of the original fruit juice in a cold but still liquid form so as to fill all the voids in and between said particles; freezing said mixture into a solidly frozen product; and later thawing said product, thereby automatically producing a slush of said particles in melted liquid.

References Cited in the file of this patent

UNITED STATES PATENTS

| | | |
|---|---|---|
| 1,190,181 | McCurdy | July 4, 1916 |
| 1,505,448 | Van Sant | Aug. 19, 1924 |
| 1,639,122 | Whitman | Aug. 16, 1927 |
| 1,882,290 | Meagher | Oct. 11, 1932 |